June 22, 1943.  J. S. SHARPE  2,322,394
MECHANICAL MOVEMENT
Filed Nov. 15, 1941  3 Sheets-Sheet 1
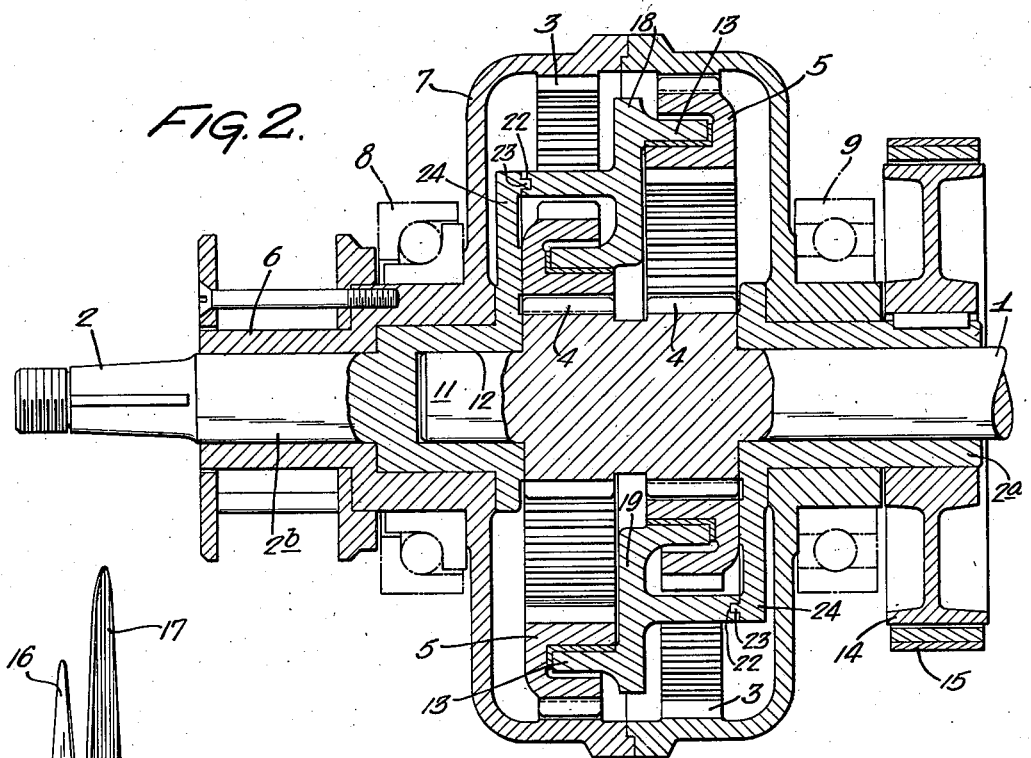
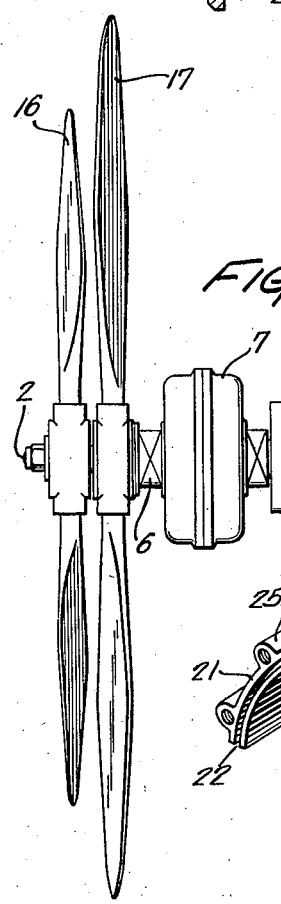
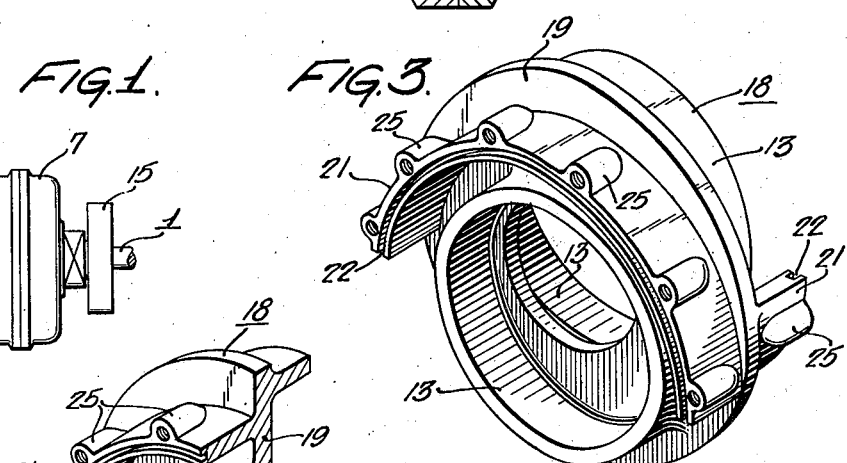
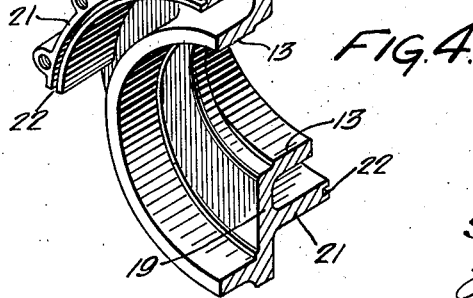
Inventor:
John S. Sharpe
by his Attorneys
Howson & Howson Inventor:
John S. Sharpe
by his Attorneys
Howson & Howson June 22, 1943.  J. S. SHARPE  2,322,394
MECHANICAL MOVEMENT
Filed Nov. 15, 1941  3 Sheets-Sheet 3
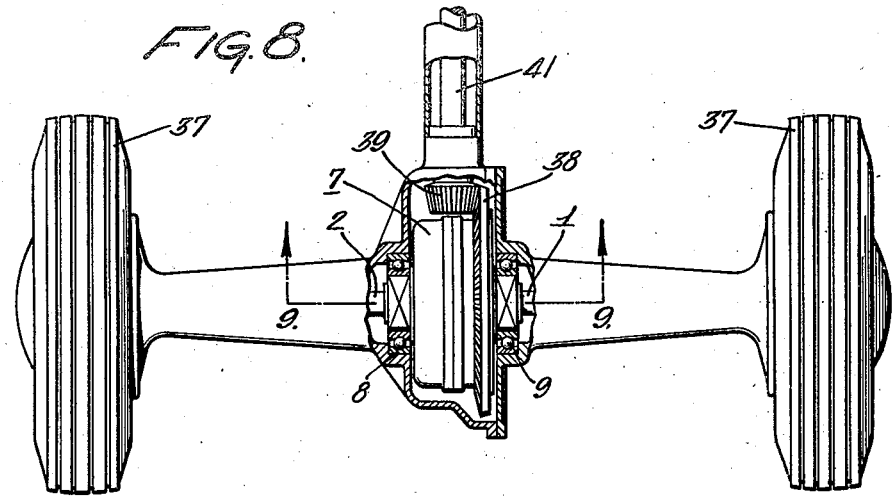
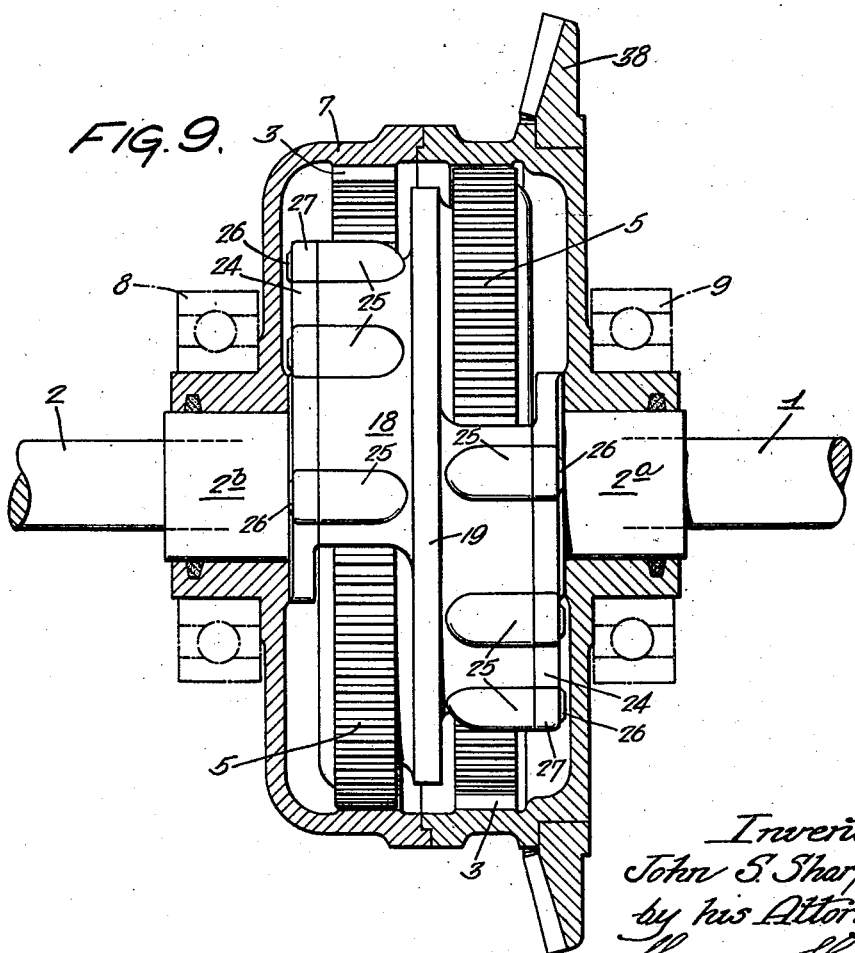
Inventor:
John S. Sharpe
by his Attorneys
Howson & Howson Patented June 22, 1943

2,322,394

UNITED STATES PATENT OFFICE 2,322,394

MECHANICAL MOVEMENT

John S. Sharpe, Haverford, Pa.

Application November 15, 1941, Serial No. 419,335

6 Claims. (Cl. 74—289)

A principal object of this invention is to provide a mechanical movement which by reason of its novel characteristics has numerous specific applications in the field of power transmission.

A number of specific applications of the mechanical movement, and the resulting new and improved transmission devices, are hereinafter described, and are illustrated in the attached drawings, in which:

Figure 1 is a side view of a dual propeller drive incorporating a transmission device made in accordance with my invention;

Fig. 2 is a sectional view of the transmission device illustrated in Fig. 1;

Fig. 3 is a detached view in perspective of one of the elements of the mechanism shown in Fig. 1;

Fig. 4 is a sectional view in perspective of the element shown in Fig. 3;

Fig. 8 is a fragmentary sectional view illustrating the drive wheels of a motor vehicle with a differential made in accordance with the present invention, and Fig. 9 is a sectional view on the line 9—9, Fig. 8.

Figure 5:
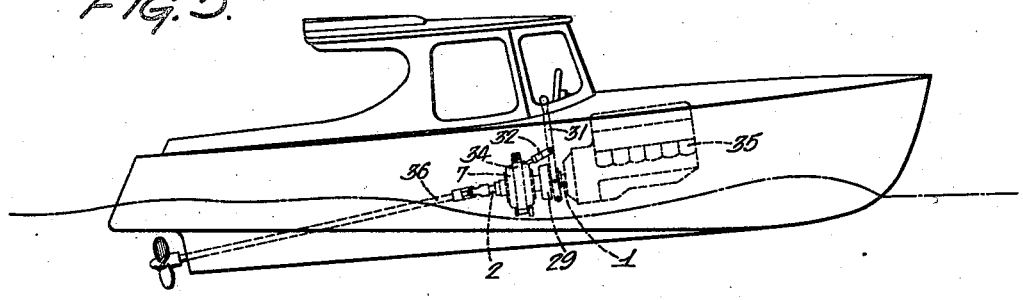
Fig. 5 is a side view of a marine vessel having a power installation incorporating a propeller reversing unit made in accordance with my invention.

The mechanical movement which forms the basis for the transmission mechanisms illustrated in the drawings comprises essentially (with particular reference to Fig. 2) two coaxial shaft elements 1 and 2, a concentrically arranged internal gear 3, a pinion 4 carried by the shaft element 1, and an annular composite gear 5 which is journaled eccentrically on the shaft element 2 and which meshes externally with the internal gear 3 and internally with the pinion 4. In the particular transmission mechanism illustrated in Figs. 1 to 4, inclusive, the element 1 constitutes the drive shaft, and the element 2 one of two driven shafts, the other of the driven shafts designated by the reference numeral 6 being formed as a part of a rotary housing 7 which carries the internal gear 3. The entire transmission device is supported in the present instance upon bearings 8 and 9 in which the housing 7 is journaled as shown, the shaft elements 1 and 2 being journaled in the housing. It will be noted that the inner or forward end 11 of the shaft 1 is journaled in an axial bore 12 in the shaft 2. In the present instance, also, the housing 7 is provided with two of the internal gears 3, the shaft 1 is provided correspondingly with two of the pinions 4, and the shaft 2 provides an eccentric bearing for two of the annular composite gears 5, the said journals 13, 13 for the gears 5 being oppositely offset from the axis of the shaft so that they are separated by angles of 180°.

The shaft 2 is extended through the right hand side of the casing 7, as viewed in Fig. 2, the extension 2a embracing the shaft 1 and having secured thereto a brake drum 14. Associated with the drum is a brake band 15 through the medium of which the shaft 2 may be immobilized or may be released for rotation as may be required. When the shaft 2 is free to rotate, rotation of the shaft 1 from a suitable power source will tend to rotate the shafts 2 and 6 in opposite directions. When the shaft 2 is immobilized through the medium of the brake 14—15, the shaft 6 will rotate in the same direction but at one-half the speed of the shaft 1.

In the dual propeller assembly shown in Fig. 1, the two propellers 16 and 17 are of different diameters, the smaller of the propellers 16 being secured to the shaft 2 and the larger to the shaft 6. In the illustrated transmission, the pinions 4 have a pitch diameter substantially three-fifths that of the internal of the associated composite gears 5; and the pitch diameter of the external of the composite gears 5 is in turn substantially five-sixths of the pitch diameter of the internals 3. If under these conditions, the propellers 16 and 17 absorb respectively one-third and two-thirds of the engine torque, the two propellers will be oppositely driven at approximately the same speed, and that speed will be about one-third the speed of the drive shaft 1. By making one or both of the propellers, preferably the propeller 17, variable as to pitch, the torque characteristics of the propellers may be readily correlated to afford the desired speed relation. When the propeller 16 is immobilized through the brake 15, the propeller 17 will rotate at one-half the speed of the drive shaft. If the propeller 16 is not of the variable pitch type, it is preferable that the propeller be self-feathering so that when immobilized the blades may offer little or no resistance to passage of air. The aforedescribed speed and torque relationships may be modified by varying the diameters of the gears 4 and 5; or by driving through the shaft 2 instead of the shaft 1.

In Figs. 3 and 4, I have illustrated certain of the details of the intermediate portion 18 of the shaft 2 which provides the journals 13, 13 for the composite gears 5, 5. As illustrated, the annular journal portions 13, 13 project axially from opposite sides of a central flange 19. Also projecting axially from opposite sides of this central flange 19 are semi-cylindrical portions 21, 21, the outer edges of which are grooved at 22 for reception of tenons 23 on the flanges 24, 24 of the shaft sections 2a and 2b. The portions 21 also have axially extending bosses 25 which are tapped for reception of securing bolts, said bolts as indicated at 26 in Figs. 6 and 9 passing through bosses 27 on the flanges 24 and being threaded into the tapped holes in the bosses 25 to thereby rigidly secure the end sections 2a and 2b of the shaft to the intermediate portion 18.

Figure 6:
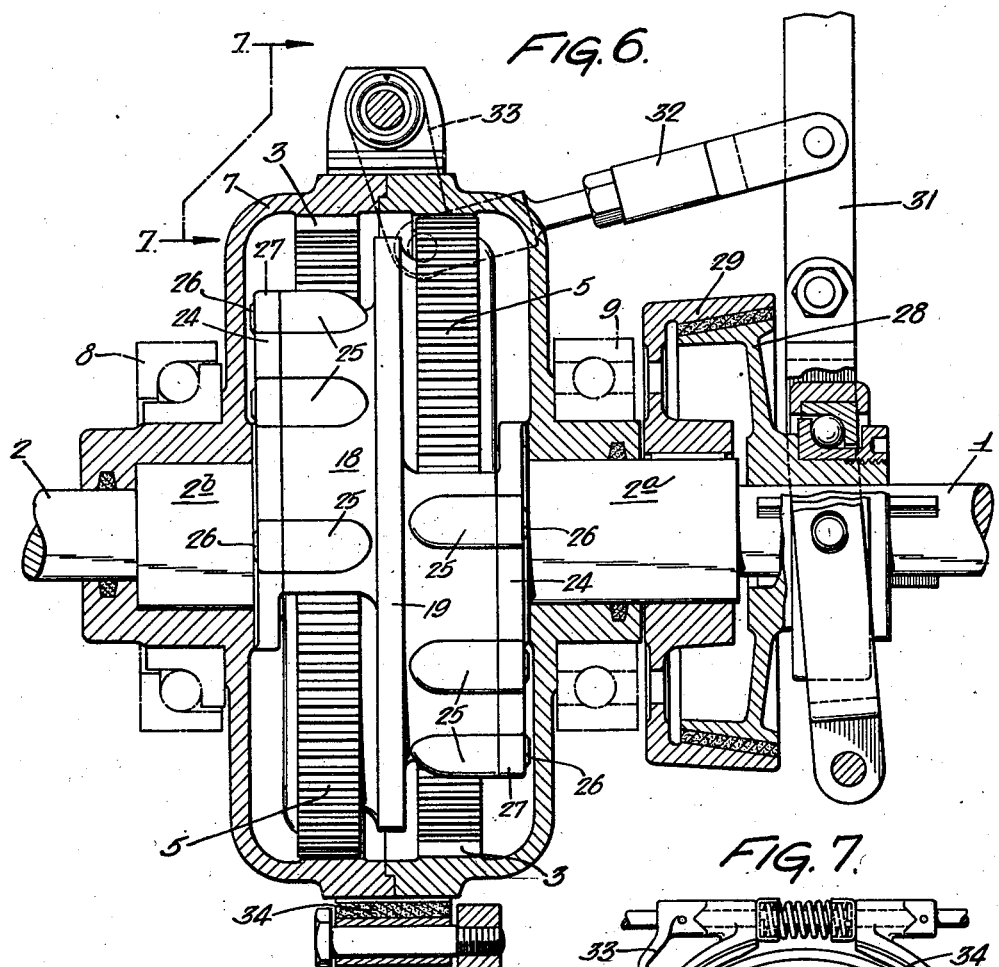
Fig. 6 is a sectional view of the reversing gear unit shown in Fig. 5.
Figure 7:
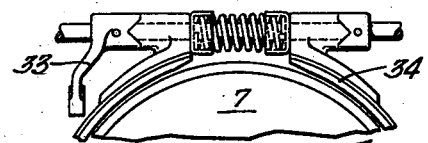
Fig. 7 is a fragmentary view as viewed from the line 7—7, Fig. 5.

In the reversing gear shown in Figs. 5, 6 and 7, the same essential combination of elements is employed as in the mechanism illustrated in the preceding figures, and corresponding elements of mechanism are accordingly identified by the same reference numerals. In this instance, the mechanism comprises the two shafts 1 and 2. The shaft 2 comprises the intermediate portion 18 and the terminal end portions 2a and 2b, said intermediate portion providing the journals for the annular composite gears 5, 5 which mesh with the internal gears 3, 3 of the housing 7 and with the pinions (not shown) on the shaft 1. In this instance, however, means is provided for interlocking the shaft 1 with the shaft 2, this means comprising a clutch element 28 splined to the shaft 1 and axially movable thereon and a relatively fixed clutch element 29 which is secured to the extension 2a of the shaft 2. Means is provided in the form of a lever 31 for interengaging and disengaging the clutch elements 28 and 29, and this lever is operatively connected through a link 32 and a cam lever 33 with a brake band 34 embracing the housing 7, and operating when tightened on the housing to immobilize the latter. The arrangement is such that when the lever 31 is actuated to engage the clutch element 28 with its companion element 29, the brake band 34 is released from the housing 7I; and when the lever 31 is actuated to engage the brake band 34, the clutch elements 28 and 29 are disengaged. Between these two positions is a neutral position in which both the clutch elements and the brake band are disengaged, and in this position the transmission of power from the engine to the propeller is interrupted. When the shafts 1 and 2 are interlocked through the clutch 28—29, the two shafts necessarily rotate as a unit, carrying with them the two annular composite gears 5, 5 and the casing 7 which has been freed for rotation by release of the brake band 34. The transmission thereby provides a direct drive transmission from the motor 35 to the propeller shaft 36 for propulsion of the vessel in the forward direction. When the clutch 28—29 is released and the brake band 34 applied to the housing 7, the immobilization of the housing causes a reverse movement of the shaft 2 and of the propeller shaft 36 to which the shaft 2 is connected. This reverse rotation, with gears of the relative pitch diameters referred to above, is at the same rate as the rotation in the other or forward direction.

The mechanism may be modified to afford a reverse rotation speed either greater or less than 100% of the forward rotation. Thus by increasing or decreasing the diameters of the gears 4 and 5, the reverse speed may be made smaller or greater than the forward speed; and further ratio changes may be made by driving through the shaft 2 instead of the shaft 1.

The differential mechanism illustrated in Figs. 8 and 9 comprises the same essential combination of elements, and here again the corresponding elements have been identified by the same reference numerals employed in the preceding figures. In this case, the shafts 1 and 2 constitute in effect the driving axles for the wheels 37, 37 of the motor vehicle. The housing 7 is provided with a bevel gear 38, which as shown in Fig. 8 is engaged by a bevel pinion 39 on a propeller shaft 41 extending to the power source. Rotation of the housing 7 tends to drive the shafts 1 and 2 together in the same direction and at the same speeds, and if the speed of rotation of one of the shafts is retarded or increased, the speed of the other shaft is correspondingly increased or retarded.

It will be understood that the duplication of the gear train 3, 4 and 5 is not essential to the operativeness of the device as shown, and that a single train may be employed if desired. By use of two trains arranged as illustrated so that their offsets from the major axis of rotation are 180° apart, a more uniform distribution of thrusts is obtained which reduces the loads on the bearings. With either single or double trains, the mechanism is susceptible to static and dynamic balancing.

I claim:

1. In a mechanical movement, a plurality of coaxial rotary elements, an internal gear on one of said elements, a pinion on another of said elements, an annular composite gear eccentrically journaled on still another of said elements and meshing externally with said internal gear and internally with said pinion, and means for selectively interlocking the two last-named of said elements and immobilizing the first-named element.

2. In a transmission mechanism, a drive shaft, a pinion on said shaft, and a pair of driven shafts, an internal gear carried by one of said driven shafts, an annular composite gear eccentrically journaled on the other of said shafts and meshing externally with said internal gear and internally with said pinion, and releasable means for immobilizing the last-named shaft.

3. In a transmission mechanism, coaxial driving and driven elements, and means for releasably interlocking said elements, an internal gear coaxial with said elements, a pinion on one of said elements, an annular composite gear journaled eccentrically on the other of said elements and meshing externally with said internal gear and internally with said pinion, and releasable means for immobilizing said internal gear.

4. In a transmission mechanism, coaxial driving and driven elements, and means for releasably interlocking said elements, an internal gear coaxial with said elements, a pinion on one of said elements, an annular composite gear journaled eccentrically on the other of said elements and meshing externally with said internal gear and internally with said pinion, releasable means for immobilizing said internal gear, and means interconnecting said immobilizing means and said interlocking means so that the engagement of either one of said means is accompanied by disengagement of the other of said means.

5. In a dual propeller drive, a driving shaft, a pair of driven shafts coaxial with the drive shaft, a coaxial internal gear carried by one of said driven shafts, a pinion on the drive shaft, an annular composite gear journaled eccentrically on the other of the driven shafts and meshing externally with said internal gear and internally with said pinion, a propeller of relatively small diameter mounted on the last-named shaft, releasable means for immobilizing said last-named shaft, and a propeller of relatively large diameter mounted on the other of said driven shafts.

6. In a mechanical movement, rotary coaxial elements defining the major rotational axis of said movement, a pair of coaxially arranged internal gears, and means for rigidly connecting said gears, a pair of pinions on one of said elements in alignment respectively with said internal gears, a pair of eccentrically arranged journals on another of said elements and oppositely offset from the axis of said element, and a pair of annular composite gears mounted respectively on said journals and meshing externally with the respective external gears and internally with the respective pinions.

JOHN S. SHARPE.